(12) United States Patent
Beheydt et al.

(10) Patent No.: US 9,706,509 B2
(45) Date of Patent: Jul. 11, 2017

(54) SYNCHRONIZATION OF STREAMING DATA (71) Applicant: CISCO TECHNOLOGY, INC., San Jose, CA (US)

(72) Inventors: Samie Beheydt, Geluwe (BE); Joris Lammers, Poperinge (BE); Gert Willems, Brugge (BE)

(73) Assignee: Cisco Technology, Inc., San Jose, CA (US)

( * ) Notice: Subject to any disclaimer, the term of this patent is extended or adjusted under 35 U.S.C. 154(b) by 212 days.

(21) Appl. No.: 14/097,920

(22) Filed: Dec. 5, 2013

(65) Prior Publication Data

US 2015/0163757 A1 Jun. 11, 2015

(51) Int. Cl.
| | |
|---|---|
| *H04W 56/00* | (2009.01) |
| *H04N 21/231* | (2011.01) |
| *H04N 21/218* | (2011.01) |
| *H04N 21/236* | (2011.01) |
| *H04N 21/24* | (2011.01) |
| *H04N 21/242* | (2011.01) |
| *H04N 21/845* | (2011.01) |

(Continued)

(52) U.S. Cl.
CPC ..... *H04W 56/001* (2013.01); *H04L 29/06027* (2013.01); *H04L 65/80* (2013.01); *H04L 69/40* (2013.01); *H04N 21/2181* (2013.01); *H04N 21/236* (2013.01); *H04N 21/23116* (2013.01); *H04N 21/242* (2013.01); *H04N 21/2404* (2013.01); *H04N 21/8456* (2013.01)

(58) Field of Classification Search
CPC ........ H04L 29/06027; H04N 21/23116; H04N 21/23103; H04N 21/242; H04N 21/2181
USPC ........................................................ 370/350
See application file for complete search history.

(56) References Cited

U.S. PATENT DOCUMENTS

| | | |
|---|---|---|
| 6,002,687 A | 12/1999 | Magee et al. |
| 6,493,386 B1 | 12/2002 | Vetro et al. |
| 6,542,546 B1 | 4/2003 | Vetro et al. |

(Continued)

FOREIGN PATENT DOCUMENTS

| | | | | |
|---|---|---|---|---|
| EP | 2605523 A1 | 6/2013 | | |
| FR | WO 2012076490 A1 * | 6/2012 | ........... | H04H 20/103 |

(Continued)

OTHER PUBLICATIONS

Extended European Search Report dated Apr. 16, 2015 cited in Application No. 14193728.4, 9 pgs.

(Continued)

*Primary Examiner* — Christopher Crutchfield
(74) *Attorney, Agent, or Firm* — Merchant & Gould P.C.

(57) ABSTRACT

An apparatus can include an interface to receive and send inter-node communications messages with respect to at least one other node. A synchronization control can implement a synchronization protocol for controlling synchronization of content chunks generated for at least one content stream based on synchronization data. The synchronization control can determine the synchronization data for the content stream (i) based on synchronization information provided in an information message received from the other node if the other node has a greater priority or (ii) based on self-established synchronization information if the other node has a lower priority.

20 Claims, 7 Drawing Sheets

(51) Int. Cl.
*H04L 29/06* (2006.01)
*H04L 29/14* (2006.01)

(56) References Cited

U.S. PATENT DOCUMENTS

| | | | |
|---|---|---|---|
| 6,606,660 B1* | 8/2003 | Bowman-Amuah | H04L 65/602 709/227 |
| 7,089,485 B2 | 8/2006 | Azadet et al. | |
| 8,074,094 B2 | 12/2011 | Haag et al. | |
| 8,169,916 B1 | 5/2012 | Pai et al. | |
| 8,214,741 B2 | 7/2012 | Errico et al. | |
| 8,532,171 B1 | 9/2013 | Narayanan et al. | |
| 8,898,717 B1 | 11/2014 | Labrozzi et al. | |
| 9,049,270 B2* | 6/2015 | Poulain | H04H 20/103 |
| 2006/0248212 A1* | 11/2006 | Sherer | H04L 29/06027 709/231 |
| 2007/0237185 A1* | 10/2007 | Pereira | H04N 21/2389 370/503 |
| 2008/0133766 A1 | 6/2008 | Luo | |
| 2008/0288607 A1* | 11/2008 | Muchow | G06F 9/44505 709/209 |
| 2012/0072757 A1 | 3/2012 | Haag et al. | |
| 2012/0128061 A1 | 5/2012 | Labrozzi et al. | |
| 2012/0265856 A1 | 10/2012 | Oran et al. | |
| 2013/0044803 A1* | 2/2013 | Fisher | H04N 21/2343 375/240.02 |
| 2013/0198322 A1 | 8/2013 | Oran et al. | |
| 2013/0272374 A1 | 10/2013 | Eswara et al. | |
| 2013/0322557 A1* | 12/2013 | Poulain | H04H 20/103 375/259 |

FOREIGN PATENT DOCUMENTS

| | | |
|---|---|---|
| WO | WO 2008/042999 A3 | 4/2008 |
| WO | 2012076490 A1 | 6/2012 |
| WO | 2013152115 A1 | 10/2013 |

OTHER PUBLICATIONS

European Office Action dated Jul. 6, 2015 cited in Application No. 14 193 728.4, 6 pgs.
Pantos, et al., "HTTP Live Streaming", Oct. 14, 2013, (pp. 1-42).
U.S. Appl. No. 13/348,094, filed Jan. 11, 2012.
"HTTP Dynamic Streaming", data sheet, Adobe Systems Incorporated, 2010 (2 sheets).

* cited by examiner

SYNCHRONIZATION OF STREAMING DATA

TECHNICAL FIELD

This disclosure relates to communications and, more particularly, to synchronization of streaming data.

BACKGROUND

Adaptive bitrate streaming is a technique used in streaming multimedia over computer networks. It works by employing a transcoder or encoder to adjust the quality of a video stream based on user parameters that can be detected in real time. Such encoder or transcoder can encode a single source video at multiple bitrates. In an architecture that might include multiple encoders or transcoders, such as for back-up or redundancy purposes, each encoder or transcoder needs to have its video and audio chunk boundaries properly synchronized.

DESCRIPTION OF EXAMPLE EMBODIMENTS

Overview

This disclosure relates generally to communications and, more particularly, to synchronization of streaming data.

As an example, a method can include receiving a message at a given node of a group of nodes that is provided from an other node in the group of nodes. A relative priority between the given node and the other node in the group of nodes can be determined based on information in the message. The method can also include setting a chunk boundary for streaming content from the given node. The chunk boundary can be set according to synchronization information provided in the message received at the given node if the other node is determined to have a greater priority than the given node. The chunk boundary can be set according to a chunk boundary location established by the given node if the given node is determined to have a greater priority than the other node.

As another example, an apparatus can include an interface to receive and send inter-node communications messages with respect to an other node. A synchronization control can implement a synchronization protocol for controlling synchronization of content chunks generated for at least one content stream based on synchronization data. The synchronization control can determine the synchronization data for the content stream (i) based on synchronization information provided in an information message received from the other node if the other node has a greater priority or (ii) based on self-established synchronization information if the other node has a lower priority.

Example Embodiments

Figure 1:
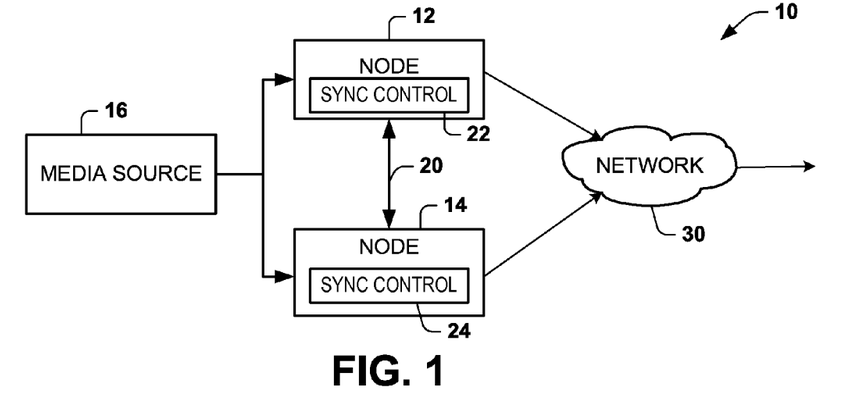
FIG. 1 illustrates an example of a system that can implement synchronization of data.

FIG. 1 depicts an example of a communication system 10 that includes a plurality of (e.g., two or more) nodes 12 and 14. Each of the nodes 12 and 14 is configured to implement a protocol for controlling synchronization of content that is provided from the nodes based on inter-node communications, demonstrated at 20. Each node 12 and 14 thus can be any device capable of implementing at least a portion of the synchronization protocol, which can include monitoring and checking synchronization of content and/or generating synchronized content according to information exchanged via inter-node communications 20, such as a network or other communications link.

As an example, each of the nodes 12 and 14 can correspond to an adaptive bitrate (ABR) transcoding node configured to generate aligned streaming content for one or more video profiles. The content that is generated by one or more of the nodes 12 and 14 can be provided downstream for consumption by an ABR client or the content generated by such node(s) 12 and 14 can be stored in one or more non-transitory storage media (e.g., flash memory, hard disk drive or the like), such as at an origin server. Examples of ABR streaming protocols that can be utilized for generate the content for streaming each rendition of a video service can include HTTP Live Streaming (HLS), Adobe systems HTTP dynamic streaming, Microsoft smooth streaming, MPEG dynamic adaptive streaming over HTTP (DASH) or other streaming protocols.

While many examples disclosed herein describe the nodes 12 and 14 as ABR transcoding nodes for generating aligned streaming media in the context of a back-up architecture for the system (a content delivery network) 10, the nodes can be implemented to synchronize and align other types of data delivered via other mechanisms. The nodes 12 and 14 thus can be co-located or distributed content distribution devices (e.g., other types of encoders and transcoders, digital content managers, content delivery servers, or the like).

Each of the nodes 12 and 14 can ingest input content from a common source 16, which can be a single source or distributed source. The input content can correspond to a digital input media stream, which can be previously encoded content or unencoded original content. In some examples, the input media content to the nodes 12 and 14 can include an input transport stream of digital audio and video content, which can contain one or more video elementary streams and one or more audio elementary streams. In other examples, the nodes 12 and 14 in the system 10 can receive other forms of content data for processing and delivery.

By way of example, each node 12 and 14 includes a respective synchronization control 22 and 24 configured to implement a synchronization protocol for controlling synchronization of content chunks generated by each respective node. The synchronization control 22 and 24 can be configured to implement the protocol according to a finite state machine or other logic that is configured to control sending the messages via the inter-node communications 20, setting the chunk boundary for each respective node. The synchronization control 22 and 24 thus can be implemented as hardware, software or a combination of hardware and software.

As a further example, each synchronization control 22 and 24 can employ an instance of the synchronization protocol and boundary decision algorithm for controlling synchronization of content chunks generated by each node for a given service. A given service (e.g., a video service) can include any number of transport streams, and each transport stream can include a respective content profile (e.g., also referred to as a rendition). The parameters for each profile can include codec, codec profile, video and audio bitrate, width and height, frame rate, and the like. Each active node 12 and 14 thus can employ chunk boundaries, as determined using the synchronization protocol, along with profile parameters for generating the aligned chunks of content.

As used herein, a chunk of content can refer to any discrete number of bits of content that can be independently encoded and decoded. For example, chunks of audio and video can be generated as segments or fragments having a prescribed duration, such as multiple seconds. Thus, a chunk boundary could also be referred herein to as a segment boundary or a fragment boundary depending on context of a given chunk. The duration of a chunk for a video service can be fixed or variable. The synchronization control 22 and 24 can determine corresponding chunk boundary that are applied by the respective nodes 12 and 14 to generate each video packetized elementary stream (PES) and audio PES packet in each respective transport stream, which can be resolved down in many cases to a single video access unit (AU) or a group of audio AUs.

The synchronization protocol implemented by the synchronization control 22 and 24 can be configured to establish synchronization for generating content based on relative priority among the respective nodes 12 and 14. The relative priority can be determined based on information provided by one or more nodes 12 or 14 via the inter-node communications 20. The inter-node communications 20 can occur over a network, which could be a serial connection between nodes, an internet protocol (IP) network, a token ring network or other form of communications. As one example, the inter-node communications 20 can occur over an IP-network in the form of a multicast user datagram protocol (UDP) message that is sent to nodes of node group associated with a service.

For example, the synchronization control 22 and 24 can be configured to cause its node to send a message that includes a node identifier to uniquely identify the node that sent the message in a respective node group for a given service. As disclosed herein, the node identifier can be fixed value for a given node or it can be a variable value assigned to each respective node. The relative values of each node identifier can in turn be utilized to select which of the respective nodes is to operate as the master. For example, the node identifier having the lowest value can be set as the master and the other nodes in the node group operate as slaves. The protocol thus enables the master to be implicitly determined based upon information contained in the messages received via the inter-node communications 20. As a result, the master node communicates its boundary decisions for synchronization of content chunks according to the synchronization protocol, which decisions are followed by each node operating for the corresponding node group in the system 10. The master node also follows its own synchronization information, which from the perspective of the master can be considered self-established synchronization information.

As disclosed herein, the synchronization control 22 and 24 can send multiple types of messages according to the synchronization protocol. For example, the message types can include a query message and an information message that is sent by one or more of the nodes 12 and 14 via the inter-node communications 20. All messages can include the node identifier of the sender, which can be utilized by a recipient node to determine its relative priority (e.g., is it a master or slave) according to the synchronization protocol.

A recipient node of a query message can employ the message to ascertain its relative priority in the node group for a given service. Additionally, in response to receiving a query message, the recipient node can send an information message via the inter-node communications. The information message can include a node identifier and synchronization information for the sender. For example, the synchronization information can specify a chunk boundary location for a boundary of a last chunk of data and a chunk length to indicate a distance from the boundary to a next chunk. The synchronization information (e.g., boundary location and chunk length) can be provided for each audio and video elementary stream that is provided in a given transport stream. As an example, the synchronization information can include a time stamp, such as a presentation time stamp (PTS) or a value derived from the PTS or another time stamp.

As a further example, a given transport stream can be encoded or transcoded according to a stream profile for a given rendition of the video service. For example, the transport stream could include one or more video elementary streams as well as one or more audio elementary streams for a respective profile. The synchronization control 22 and 24 of each corresponding slave node thus determines its next chunk boundary based on the chunk boundary information received in the information message from the master node. For example, the synchronization control 22 or 24 of the slave node is configured to extrapolate the next chunk boundary location based on the synchronization information last received, such as by counting a corresponding number of frames to ascertain the boundary of the next chunk that is to be generated. It is possible that a slave node may not receive synchronization information from the master for each chunk that is to be generated. Thus, the slave can employ an earlier chunk boundary and extrapolate forward across multiple chunks to ascertain the next chunk boundary for use in generating corresponding chunks of each respective elementary stream in its output transport stream.

As mentioned above, the synchronization control 22 and 24 for a corresponding master node can periodically send the synchronization information such as for each chunk that is generated. For example, a typical chunk in an ABR transcoding scheme can have a duration of about two seconds. However, the protocol for synchronization implemented in the system is sufficiently robust such that the exchange of synchronization messages between the nodes 12 and 14 is not time critical. For so long as the relative priority between the respective nodes 12 and 14 remains unchanged, each of the nodes in the node group utilizes the sync information provided by the current master.

In the example of FIG. 1, the nodes 12 and 14 are demonstrated as generating content based on the synchronization message. In other examples, one or more nodes in a node group for a service may operate more passively to monitor the inter-node communications 20 and maintain synchronization, but not generate content based on such synchronization. Such monitor can be activated in response to an event or it can send a proxy message on behalf of the master (e.g., including synchronization information and the node identifier for the current master) to facilitate synchronization of a new node that might be activated.

While the system 10 demonstrates two nodes 12 and 14 in the example of FIG. 1, the system can operate with any number of two or more nodes. Additionally, the respective nodes 12 and 14 can reside in different devices or can reside co-located within a given device such as on separate circuit boards of a transcoding or encoding device.

Figure 2:
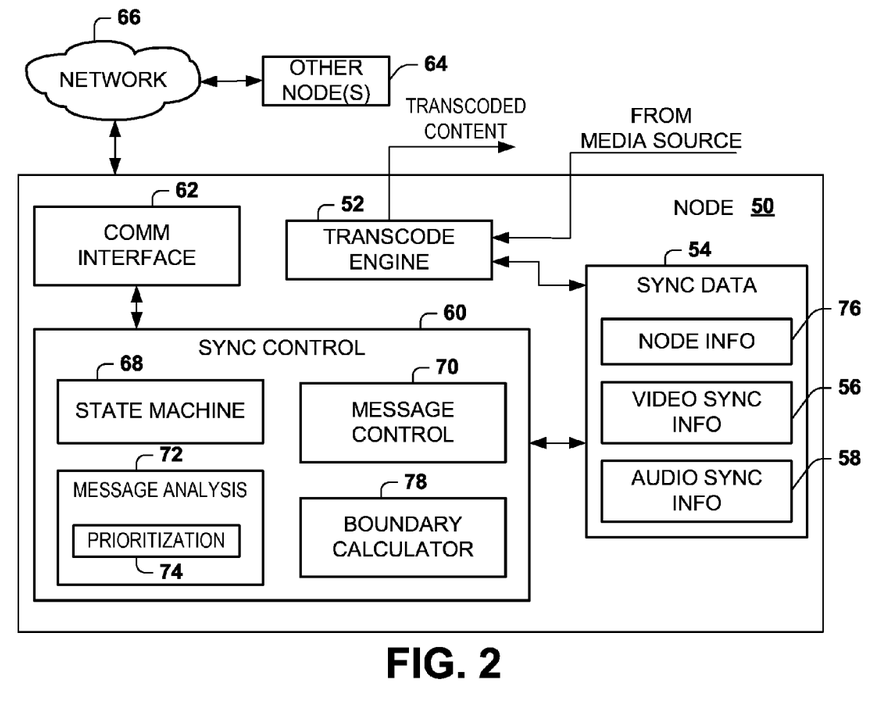
FIG. 2 illustrates an example of a node that can be configured to synchronize data.

FIG. 2 depicts an example of a node 50 that is configured as an ABR transcoder to transcode chunks of content data for a video service. The node 50 can correspond to one of the nodes 12 or 14 disclosed with respect to the system of FIG. 1. The node 50 includes a transcode engine 52 that is configured to transcode content from a media source based on synchronization data 54. The synchronization data 54 includes video synchronization information 56 and audio synchronization information 58 for each of the elementary streams of a given video service. The video and audio synchronization information 56 and 58 is established based on a synchronization control 60. The synchronization control 60 can correspond to the synchronization control 22 or 24 disclosed with respect to FIG. 1.

The synchronization control 60 can receive and send messages via a communication interface 62. The communication interface thus can be configured to communicate with one or more other nodes 64 via a communication link, demonstrated as a network 66. For example, the network 66 utilized to communicate messages for the inter-node communications can be implemented via a transport layer protocol (e.g., TCP, UDP, stream control transmission protocol), such as can be employed for communicating multicast messages among the respective nodes of a node group assigned to a given service.

The synchronization control 60 can implement a state machine 68 that includes logic configured to control the synchronization process, including to control communicating messages and setting chunk boundary locations. An example of the state machine 68 is disclosed herein with respect to FIG. 3. Thus, depending on the current state of the node 50 the synchronization control 60 can execute logic (e.g., machine readable instructions) for controlling its synchronization related functions.

The synchronization control 60 can thus include a message control function 70 that is configured to control sending messages via the communication interface 62 to one or more other nodes 64. As disclosed herein, the message function can send a query message or an information message. Each of the messages can include a node identifier to uniquely identify the node—at least in the node group. The query message can be sent to nodes of a corresponding node group for requesting a response, namely, an information message, to enable the node 50 to determine its relative priority among the nodes in the node group. The information message can include synchronization information that specifies a boundary location and a chunk length, which can be utilized by one or more other nodes in the group for setting chunk boundary locations for a next chunk of content for each elementary stream (e.g., audio and video) that is to be generated by such node(s).

The message control 70 can be configured to periodically send messages based upon the state of the node specified by the state machine 68. For instance, if the node 50 determines it is a master node operating in a normal running state, the message control 70 can periodically send an information message (see, e.g., FIG. 5) that includes the current video synchronization information 56 and the audio synchronization information 58. The time interval for sending such messages can be based on a running clock or in response to prescribed events that occur, such as completion of generating a transcoded chunk output of a transport stream. As an example, the message control 70 can send the information message at an interval of about every ten seconds or so to specify the last chunk boundary locations and a cadence for each elementary stream. Each other node 64 can employ such information to extrapolate the future chunk boundary locations. IF the state machine indicates a start-up state for the node 50, the message control 70 can send a query message (see, e.g., FIG. 4) to discover if any other nodes are in the corresponding group and generating the same content. Each of the other nodes 64 can respond to the query message by sending a response that includes an information message that includes a node identifier and synchronization data for such node, as disclosed herein.

The synchronization control 60 can also include a message analyzer 72 that can be a function configured to analyze the information in a message that is received at the node via the network 66. The message analysis 72 can determine if the message is for nodes in the same node group to which the node 50 belongs, such as based on a group identifier or other header information in the received message. The message analysis function 72 can also include a prioritization function 74 to determine a relative priority of the node 50 based on information contained in the received message. For example, the prioritization function 74 can include a comparison function that compares a node identifier of the node 50 with the value of a node identifier in the received message and, based on the comparison, determines a relative priority of the node for purposes of synchronization. The relative values of the node identifiers can thus be used to implicitly and automatically set the node state as a master node or a slave node. For example, a node having the lowest node identifier value can be set as the master node in the given node group such that the state machine 68 of each node can set the state of the synchronization control 60 based on the prioritization function 74. As disclosed herein, the node identifier for the originator of a given message can be fixed or it can be a programmable variable for each node.

The synchronization control 60 can also include a boundary calculator 78 configured to calculate a boundary for a next chunk for each elementary stream based on the synchronization data 54 for each respective elementary stream. If the state machine 68 indicates that the node 50 is the master, the boundary calculator 78 can compute its own next boundary such as by extrapolating the next boundary from the current video synchronization information 56 for each video elementary stream. The boundary calculator 78 can also calculate chunk boundary for each audio elementary stream based on the audio synchronization information 58 for each respective elementary stream. The synchronization data 54 includes synchronization information for each elementary stream that is being transcoded. The boundary calculator 78 can determine a boundary location by employing the distance stored in memory, corresponding to the synchronization data 54, to extrapolate to the next boundary location from the stored preceding boundary location. The newly computed boundary values can be stored in the synchronization data 54 including the video synchronization data 56 and the audio synchronization information 58 for each elementary stream in the service. The transcode engine 52 can then transcode each chunk of audio and video received from the media source based on the corresponding profile parameters and the newly computed boundary locations and, in turn, provide transcoded audio and video elementary streams. Additionally, the message control 70 can send the updated synchronization data 54 in a corresponding information message, which can be a periodic message or in response to query message. If the node 50 operates as a slave in the node group, the boundary calculator 78 can compute the chunk boundary locations for video and each audio elementary stream as just described; however, the video synchronization information and audio synchronization information for each elementary stream can be acquired from an information message received from a master node 64.

Figure 3:
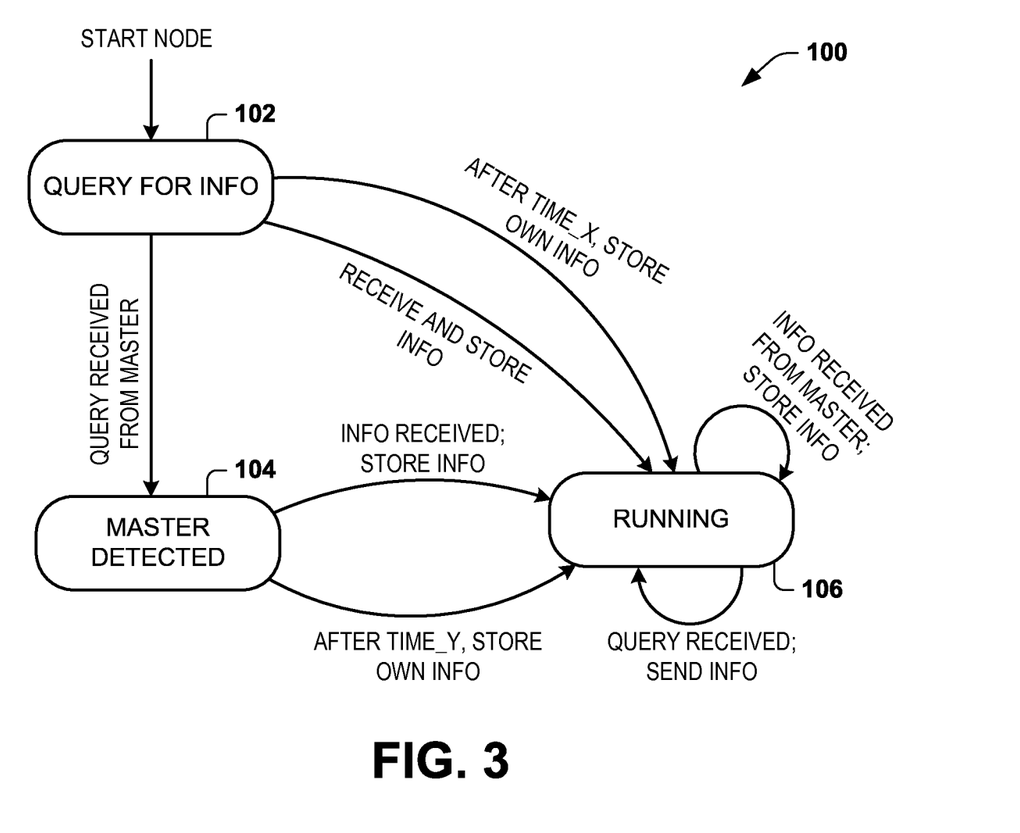
FIG. 3 illustrates an example of a state machine that can implement a synchronization protocol.

FIG. 3 depicts an example of a state machine 100 that can be implemented by a node (e.g., the node 50 of FIG. 2 or the node 12 or 14 of FIG. 1), such as an ABR streaming transcoder. The functions demonstrated with respect to the state machine 100 can be implemented as instructions executed by a processing resource (e.g., one or more processing cores) and which can be stored in a non-transitory computer readable medium. In other examples, the logic and functions demonstrated by the state machine 100 could be implemented by hardware or firmware logic configured to implement the functions demonstrated in FIG. 3. A given node can implement one or more instances of the state machine 100 in which each instance of the state machine is associated with a given video service, for example.

A given node can start up and be activated in response to a receiving a group ID. In other examples, a node can restart in response to an event, such as a power failure or when a corresponding node has been configured as a new unit in a corresponding transcoder group. Once started, the node enters a "query for info" state 102 in which the respective node (e.g., message control 70 of FIG. 2) sends a query message (see FIG. 4) via the inter-node communication disclosed herein. For example, the query message can be sent as a multicast message to each node having a predetermined group ID that is common to the node executing the state machine 100.

From state 102, the node can transition to state 104 in response to receiving a query from another node having a higher priority than the node executing the state machine 100 (e.g., from a master node). The determination of whether the sending node of the query message has a higher priority can be determined (e.g., by message analysis function 72 of FIG. 2) based on the node identifier that is provided in the message. For example, if the node ID of the sender is less than the node ID of the recipient node, the sender node can be identified as the master enabling a transition from state 102 to state 104 denoted as "master detected" state.

From state 104, the state machine can transition to a normal operating "running" state 106 in response to detecting one or more conditions. For example, while in state 104, if an information message is received, the synchronization information in the message can be stored and the node can transition from state 104 to the running state 106. Additionally or alternatively, a timer can be implemented to enable a transition from state 104 to state 106 in response to a timeout event. For example, if the timer indicates that a predetermined time, such as can be greater than the duration for transmission of a chunk of content, the node can determine that it has not yet received a timely information message despite detecting a master and, in turn, store its own synchronization information for setting the boundary locations for chunks of audio and video data to be streamed.

Back in state 102, the node can transition from state 102 to the running state 106 in response to detecting one or more conditions. For example, if another timer reaches a prescribed time limit (time_x) after sending the query message (e.g., about 10 seconds), the node can store its own synchronization information for use in setting chunk boundary locations for audio and video and then enter the running state 106. This can correspond to a situation in which no response to the query that was provided upon entry of state 102 is received within the prescribed time period (time_x). Additionally or alternatively, an information message can be received from another node within the prescribed time period (time_x) following entry into state 102, the synchronization information in the message can be stored in memory and the node can enter the running state 106.

In the running state 106, the node can receive an information message or a query message from one or more other nodes operating in the designated node group. For example, if an information message is received from a master node, the node can store the synchronization information from the message and remain in the running state 106. If a query message is received, the node can send an information message via the inter-node communication link based on its stored synchronization information. While in the running state 106, the node can also periodically send an information message via the inter-node communication link. For example, the periodic transmission of the information message from the node can be set to an interval that is about the same time interval as duration (time_x) utilized to transition from state 102 to state 106.

Figure 4:
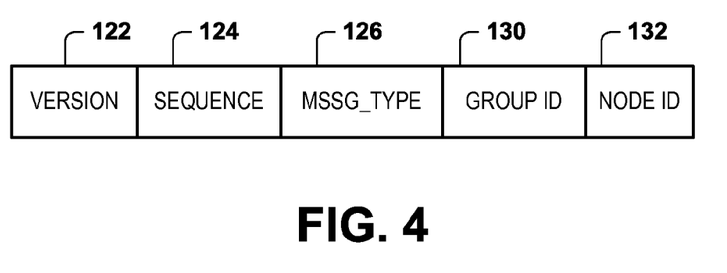
FIG. 4 illustrates an example format for a query type of message.

FIG. 4 depicts an example of a message header 120, which itself can correspond to a query message. The message header 120 includes a version field 122, a sequence field 124, a message type field 126, a group ID field 130 and a node ID field 132. The version field 122 can indicate a protocol version and the sequence field can identify a sequence number for a particular message that is being transmitted. The message type field 126 can specify the type of message, namely, whether the message is a query message or an information message. The group ID field 130 can specify a multicast group of related nodes that have been instantiated with the state machine for processing the elementary streams for a corresponding service. The group ID 130 also can operate as a multicast address for messages. Other information can be included in the header 120, such as data to identify a transport stream associated with a particular video service that is being provided, such as can correspond to an ABR profile or rendition of a stream of content that is being provided as one or more ABR streams.

The node ID 132 can uniquely identify the originator node that sent the message. As an example, the node ID 132 can be a fixed parameter for each node that is set to or be derived from one or more of a chassis serial number, media access control (MAC) address, the circuit board serial number or other descriptive parameter for the node. In other examples, the node ID can be a programmable value such that it can be specified for a given node in response to a user input. In this way a user (e.g., a person or application) can obtain some control over which node can operate as a master or a slave. As disclosed herein, the node ID 132 can be used to implicitly ascertain the relative priority of each node in a given node group. As an example, a node with the lowest node ID in the group can define the master that decides boundary locations for chunks in each of the elementary streams associated with the corresponding video service. As another example, a node having the highest node ID in the group can define the master.

Figure 5:
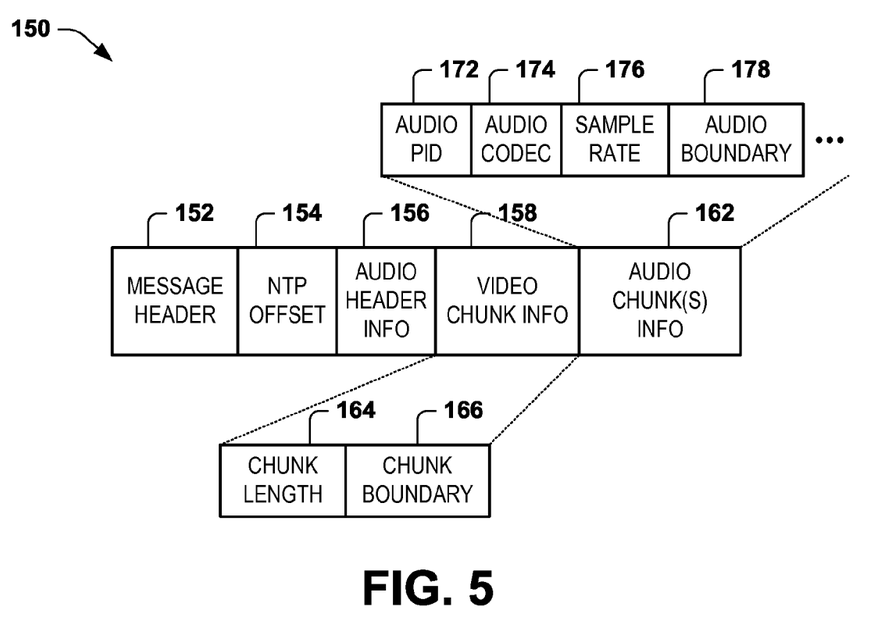
FIG. 5 illustrates an example format for an information type of message.

FIG. 5 depicts an example of an information message 150. The information can include a message header field 152, such as the message header 120 demonstrated in the example of FIG. 4. However, with respect to the message type field 126, it would identify the message type as being information message instead of a query message. The information message 150 can also include an NTP offset field 154, an audio header information field 156, a video chunk information field 158 and one or more audio chunk information fields 162. The NTP offset field 154 can specify an offset time (e.g., in microseconds) that the network time protocol is shifted for the transport stream. The audio header information field 156 can be utilized to specify information (e.g., metadata) about the audio elementary streams, such as including the number of audio elementary streams associated with different packet identifiers (e.g., the number of audio PIDs).

The video chunk information field 158 can include data representing a chunk length field 164 and a chunk boundary field 166. The chunk length field can include information that defines the length of a video chunk (e.g., a segment or fragment of video), which can be a fixed parameter for a given service or it can be a variable parameter. The chunk boundary field 166 identifies a temporal parameter, such as a time stamp (e.g., a presentation time stamp (PTS)) for a last chunk boundary that was a generated for an elementary stream of video. In some examples there may be more than one video chunk information field 158, such as to specify different parameters for different types of video chunks.

There can be a corresponding audio chunk information field for each audio elementary stream that is provided for a given service. There can be any number of streams, which can include audio elementary streams in different languages or different codecs, for example. As mentioned, the number of audio chunk information fields 162 would be specified by the audio header information field 156. The audio chunk information field 162 can include an audio PID field 172, an audio codec field 174, a sample rate field 176, and an audio boundary field 178. The audio PID field 172 can specify the packet ID for a respective audio elementary stream. The audio codec field 174 can specify the audio codec that is utilized for encoding and/or decoding the respective elementary stream. Each audio elementary stream can also include a unique sample rate which can be specified by the sample rate field 176. The corresponding audio boundary location can be specified by the audio boundary field 178, which can include or be derived from a time stamp (e.g., the PTS).

FIGS. 6, 7, 8 and 9 are sequence diagrams demonstrating the flow of messages over an inter-node communication link (e.g., a network) for a group of nodes each operating according to the protocol as disclosed herein. For example, the nodes demonstrated in the examples in FIGS. 6, 7, 8, and 9 can each implement a state machine for controlling messaging and synchronization, such as according to the state machine 100 disclosed with respect to FIG. 3. The number of nodes in each example is for purposes of illustration to demonstrate how the protocol would operate and is not to be considered limiting about the number of nodes that could be implemented in a system.

Figure 6:
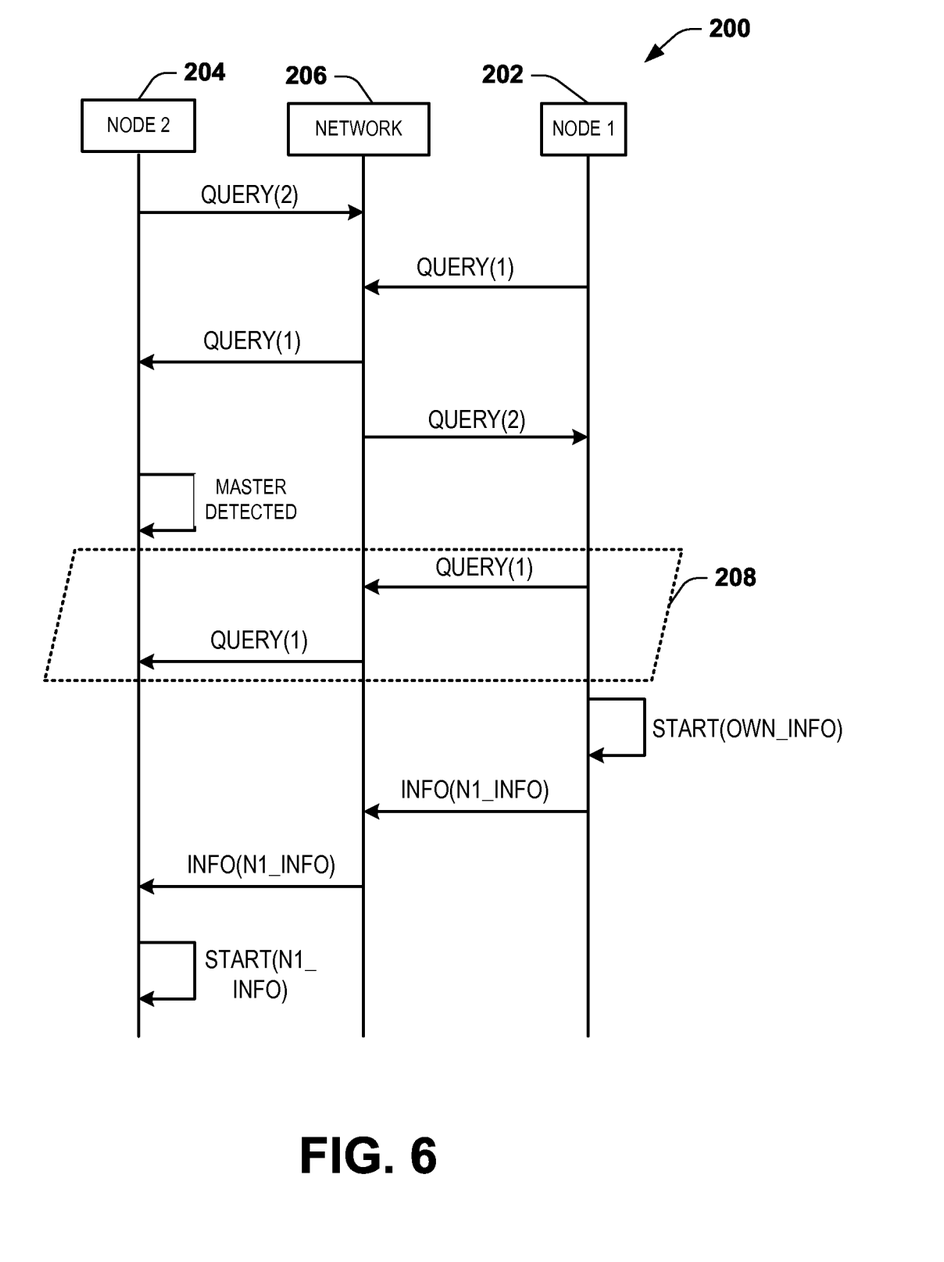
FIG. 6 illustrates an example of a sequence diagram for synchronization that can be implemented.

FIG. 6 demonstrates a system 200 in which a pair of nodes 202 and 204 starts up at substantially the same time. The node 202 (Node 1) is presumed to have a higher priority (e.g., the master) relative to the node 204 (Node 2). At start up, each of the nodes 202 and 204 sends a query to a network 206 which in turn communicates the message to the respective other nodes. In this and other examples, the parenthetical "1" following message designation "query" denotes that the QUERY(1) comes from Node 1 and the query parenthetical "2" denotes that QUERY(2) originates with node 2. In response to node 204 receiving the query from node 1, the node 204 determines that the received query was provided from a master node based on the node identifier in the query message. Thus, the node 204 enters the master detected state (e.g., state 104 of FIG. 3).

The node 202 in response to receiving the QUERY(2) determines that it is the master itself, and thus enters a loop in which it repeatedly sends a query periodically to the system as indicated at loop 208. Thus the query is transmitted via the network 206 to each other node 204. As it initiates the loop at 208, the node 202 enters a normal operating mode (e.g., state 106 in FIG. 3) and utilizes its own synchronization information to enter the running state since it has determined itself to be the master in the system 200 based on having a node ID that is less than the node ID in the QUERY(2) message from node 204. As it starts the running state, the node 202 sends an information message with its synchronization information to the network 206. The node 204 receives the information message via the network 206 and also enters the running state utilizing the synchronization information (N1_INFO) from node 202.

Figure 7:
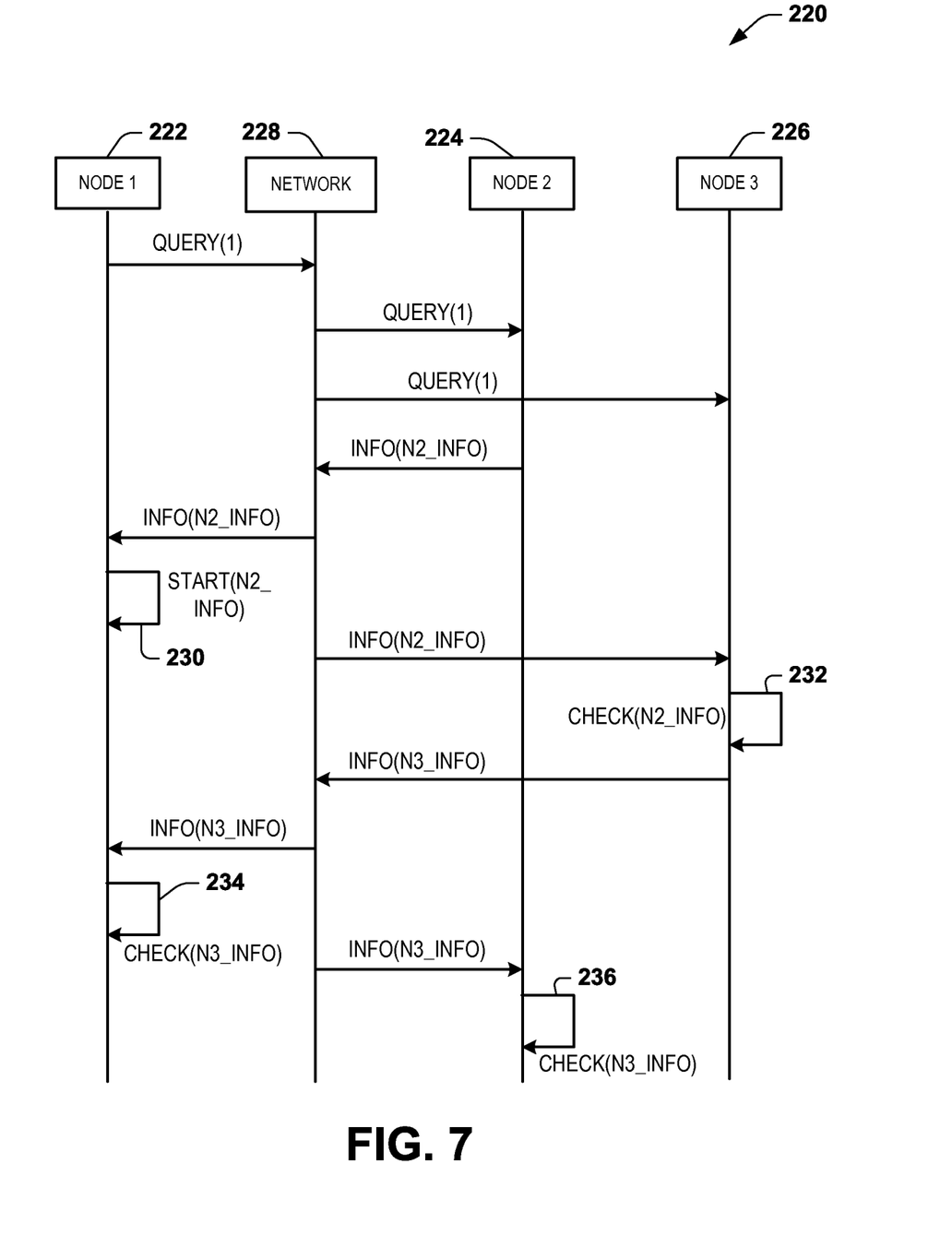
FIG. 7 illustrates an example of a sequence diagram demonstrating another scenario for synchronization that can be implemented.

FIG. 7 demonstrates an example of a sequence diagram for a system 220 that includes a plurality of nodes 222, 224 and 226. Each of the nodes 222, 224 and 226 is connected to a network 228 for inter-node communication, such as disclosed herein. In the example of FIG. 7, it is presumed that nodes 224 and 226 are already operating and synchronized when a new node 222 is started. In this example it is further presumed that the new node 222 is a potential master in that it has a node ID (NODE 1) that affords a higher level of priority that the node ID of each of nodes 224 and 226 (NODE 2 and NODE 3, respectively).

At start up in the system 220, the node 222 sends a query (QUERY(1)) to the network 228, which is distributed to nodes 224 and 226. In response, node 224 responds with an information message that includes the synchronization information (N2_INFO) from node 224. The information message from node 224 is provided to node 222 via the network 228. In response to analyzing the received information message from node 224, the node 222 enters the running state and begins generating content chunks synchronized based on the synchronization information N2_INFO that was provided in the information message from node 224, demonstrated at 230. Node 226 also receives the information message that was sent by node 224 and uses the synchronization information to check its own synchronization information to determine if it is in sync, as demonstrated at 232. FIG. 7 also demonstrates the node 226 sending its information message that includes its own synchronization information N3_INFO for which is provided to nodes 222 and 224 via the network 228. Node 222 performs a check, indicated at 234, with respect to the synchronization information received in the information message provided by node 226. Node 224 performs a similar check at 236 in response to receiving the information message from node 226. Thus, FIG. 7 demonstrates that when a new potential master node 222 starts up where other nodes 228 and 226 are already synchronized, the newly added node will not disrupt the synchronization of the existing nodes and will start in sync based on the synchronization information currently utilized in the network. Eventually, the nodes 224 and 226 will synchronize to synchronization information sent by the node 222—the new master node.

Figure 8:
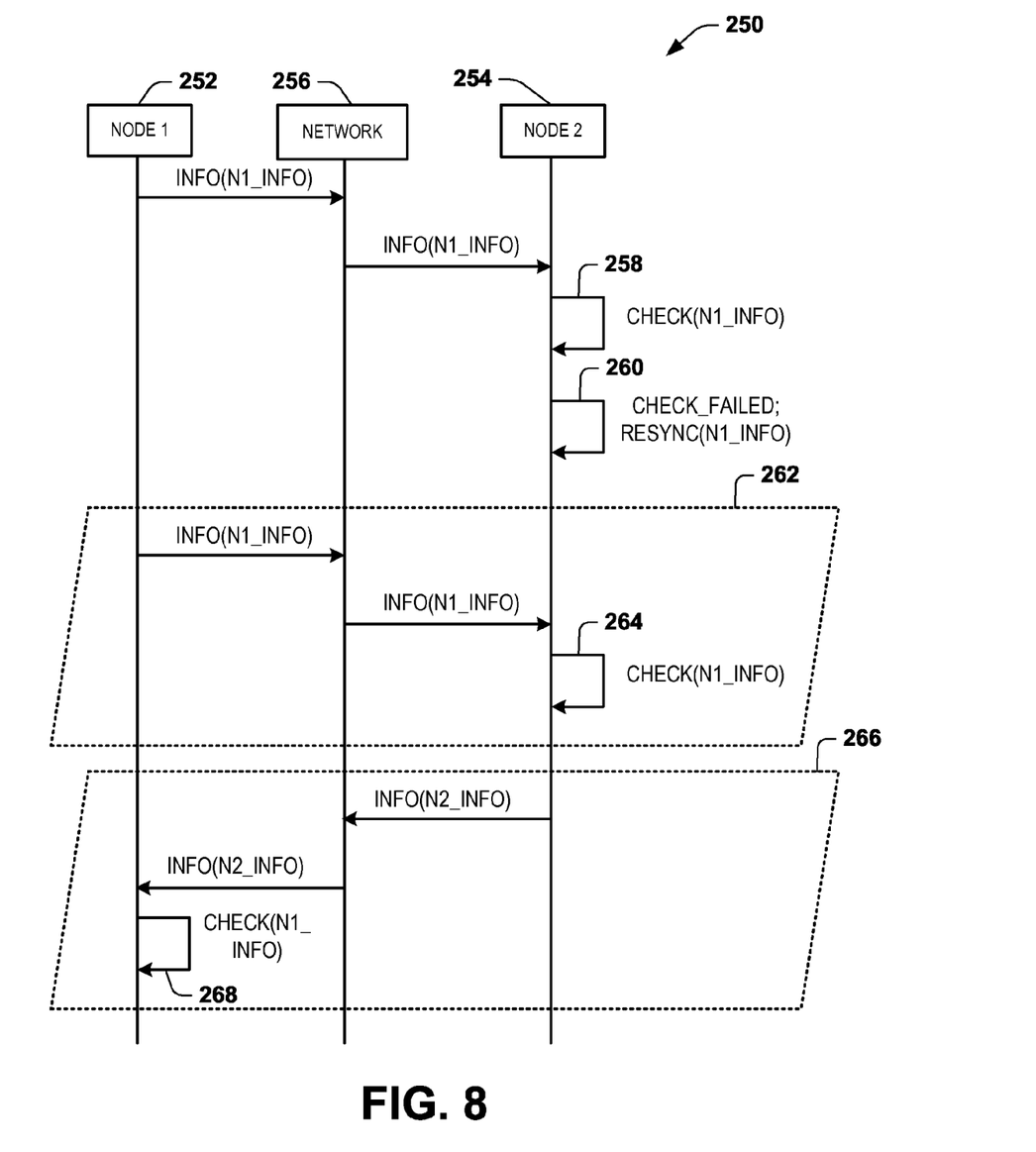
FIG. 8 illustrates an example of a sequence diagram demonstrating another scenario for synchronization that can be implemented.

FIG. 8 demonstrates another sequence diagram for system 250 demonstrating communications between nodes 252 and 254 via a network 256. The example of FIG. 8 demonstrates a scenario in which the non-master node 254 receives synchronization information that is different from the synchronization information stored at such node. In this example, the node 254 has a node ID value that is greater than the node ID value of the node 252 that sent the information message. Thus, in this example, node 252 is the master, and sends an information message to the network 256 that includes synchronization information (N1_INFO), which the network provides to the node 254. In response, node 254 performs a check with the received synchronization information, demonstrated at 258. The check, for example, compares the synchronization information N1_INFO received in the message to its own synchronization information, which is stored in memory and utilized by the node 254 for transcoding the audio and video chunks. As a result of the check failing, such as in response to one or more of its chunk boundaries not being aligned with those specified in the information message, the node 254 resynchronizes and restarts its boundary decision algorithm using the synchronization information N1_INFO provided in the information message from the node 252, demonstrated at 260.

Upon resynchronization, the node 254 is synchronized with the node 252 and each of the nodes can operate in a normal running state executing a periodic control loop, demonstrated at 262 and 266. For example, the node 252 can send an information message periodically (e.g., at an interval of about every ten seconds) to the network 256 that is provided to the other node 254. The node 254 can perform a check on the synchronization information, demonstrated at 254, to determine that its chunk boundaries are properly aligned with the chunk boundaries specified by the synchronization information N1_INFO in the information message. Similarly, the node 254 can perform a loop demonstrated at 266 in which it sends an information message with its own synchronization information (N2_INFO) to the network 256, which provides the message to the node 252. The node 252 receives the message, extracts the synchronization information and performs a synchronization check, demonstrated at 268. Provided that both nodes continue to run in synchronization without detecting any fault conditions, loops 262 and 266 will continue with boundary decisions being based on the synchronization information N1_INFO of the node 252.

Figure 9:
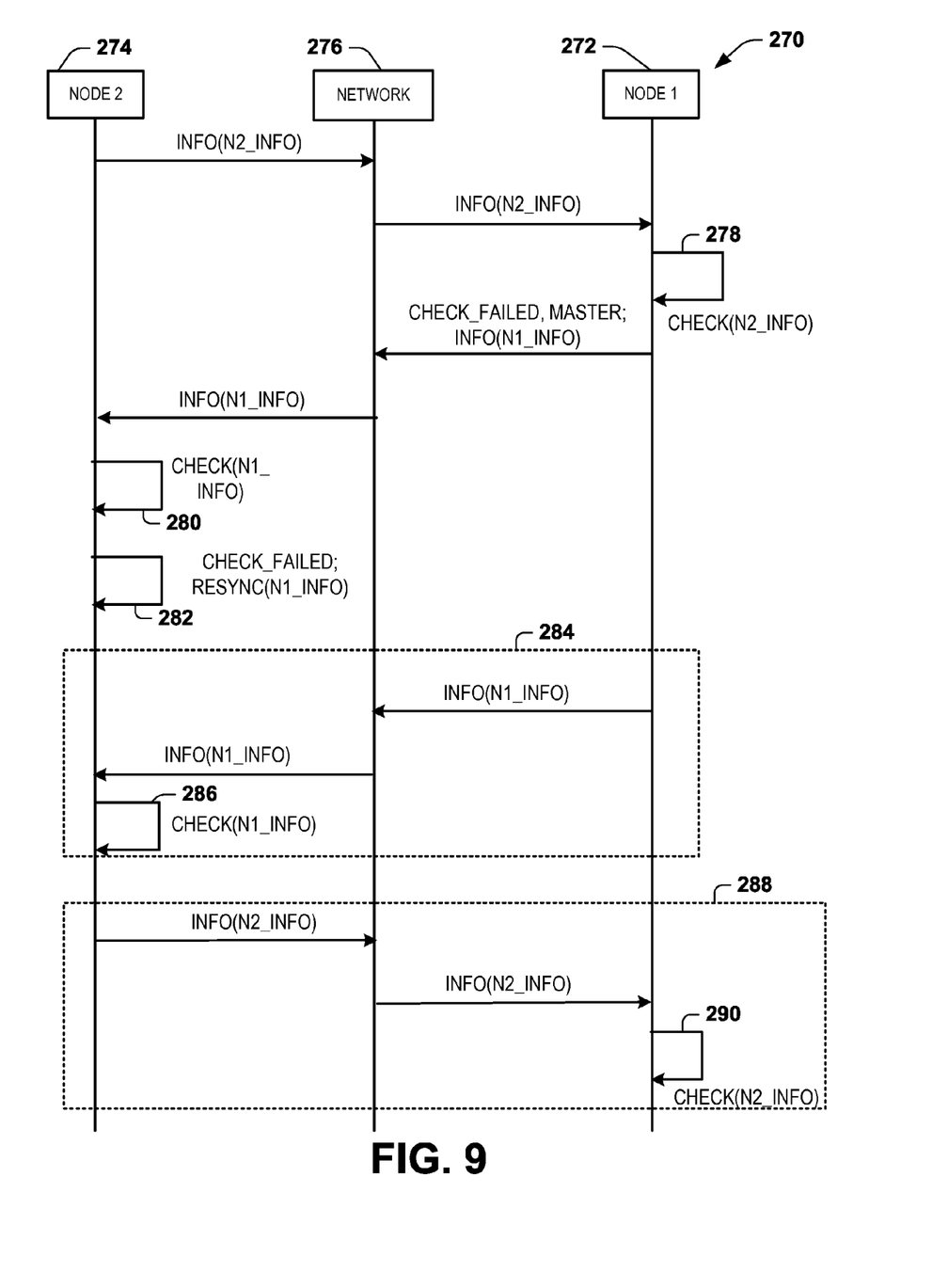
FIG. 9 illustrates an example of a sequence diagram demonstrating yet another scenario for synchronization that can be implemented.

FIG. 9 demonstrates another example of a sequence diagram for a system 270 demonstrating a scenario where a master node 272 receives an information message from a non-master node 274 via the network 276. In response to the information message, the node 272 performs a check the synchronization information (N2_INFO) provided in the received information message, demonstrated at 278. In this example, it is determined that the check at 278 fails, such as by the node 272 determining that its chunk boundaries are not aligned with the chunk boundaries specified by the synchronization information N2_INFO. In response to determining that the check 278 failed, the node 272 (being the master) sends an immediate information message to the node 274 via the network 276. In response to the information message from the node 272, the node 274 performs a check on the synchronization information N1_INFO, demonstrated at 280. In this case, the node 274 determines that the check at 280 fails, such as due to detecting one or more misaligned chunk boundaries. Since the node 274 is determined to be out of sync with the master, the node 274 re-syncs its synchronization information (e.g., chunk boundaries) based on the synchronization information N1_INFO provided in the information message, demonstrated at 282. At this stage, both nodes 272 and 274 are synchronized and operate in a steady run state. For instance, the node 272 operates in a loop demonstrated at 284 in which it periodically sends its information message, which is received at the node 274 via the network 276 and for checking its synchronization information. Similarly, the node 274 operates in a loop demonstrated at 288. In this loop 288, the node 274 also periodically sends its information message to the network 276 which is received by the node 272. The node 272 performs a check, demonstrated at 290, with the synchronization information provided by the node 274. Each of the nodes 272 and 274 can continue to operate in its respective loop 284 and 288, the checks at 286 and 290 continue to validate the synchronization information.

In view of the foregoing it is understood that the approach disclosed herein can enable redundant data delivery devices (e.g., transcoders, encoders or the like) to operate concurrently in a hot-hot backup architecture in which multiple devices actively generate synchronized data. Alternatively, the approach disclosed herein is equally applicable to a hot-cold backup architecture in which one or more back-up node operates in a cold standby state. While operating in cold standby, the node does not generate content based on the synchronization information that is exchanged. Instead, in some examples, the back-up node can be configured to listen passively to messages for its group and store the appropriate synchronization information for chunk boundaries, such as disclosed herein. In other examples, such as where the back-up node serves as a back-up for a plurality of different node groups, the back-up node can remain in a standby mode without storing any synchronization information for a particular group. In response to the activation or startup of such node in standby for a node group associated with given service, the back-up node will query the other nodes, receive one or more information messages that can be employed for synchronization of chunk boundaries. In some examples, a monitoring node can be connected to the group network and store synchronization information for one or more node group and provide synchronization information to configure the back-up node at or just prior to start-up to facilitate synchronization.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:

1. A method comprising:
receiving a message at a given node of a group of nodes that is provided from an other node of the group of nodes, wherein the message comprises a node identifier and chunk information for the other node, the chunk information comprising a video chunk information field having a chunk length field and a chunk boundary field;

determining a relative priority between the given node and the other node of the group of nodes based on the node identifier;

electing a master node for the group of nodes based on the determined relative priority, the master node having a highest relative priority in the group of nodes;

setting a chunk boundary for streaming content from the master node, wherein setting the chunk boundary comprises setting the chuck boundary corresponding to the chunk information from the chunk length field and the chunk boundary field of the elected master node; and sending, to the group of nodes, a synchronization information comprising chunk boundary information, the chunk boundary information comprising a chunk boundary location for a boundary of a last chunk of the streaming content and a chunk length indicating a distance from the boundary to a next chunk of the streaming content.

2. The method of claim 1, further comprising performing a check at the given node to determine if the chunk boundary location for streaming the content from the given node is properly aligned with a corresponding chunk boundary location determined from the synchronization data in the information message from the other node.

3. The method of claim 2, wherein in response to determining that the check fails and if the given node has the greater priority, the method further comprising sending another information message from the given node.

4. The method of claim 2, wherein in response to determining that the check fails and if the other node has the greater priority, the method further comprising recalculating the chunk boundary for streaming subsequent content from the given node according to the synchronization data provided in the information message, the recalculated chunk boundary being stored as synchronization data at the given node.

5. The method of claim 1, wherein determining the relative priority of the given node further comprises comparing the node ID data from the query message with the node identifier of the given node, such that the given node sets itself as one of a master node or a slave node based on the comparison.

6. The method of claim 1, wherein the content comprises a video service, the streaming content from the given node comprises at least one video elementary stream and a plurality of audio elementary streams, a corresponding chunk boundary location being set for each video elementary stream and each of the plurality of audio elementary streams.

7. The method of claim 6, further comprising transcoding at least some of the elementary streams at the given node to generate transcoded elementary streams having chunks of content that are aligned based on the chunk boundary that is set for each of the at least some elementary streams.

8. A non-transitory computer-readable medium that stores a set of instructions which when executed perform a method executed by the set of instructions comprising:

receiving a message at a given node of a group of nodes that is provided from an other node of the group of nodes, wherein the message comprises a node identifier and chunk information for the other node, the chunk information comprising a video chunk information field having a chunk length field and a chunk boundary field;

determining a relative priority between the given node and the other node of the group of nodes based on the node identifier;

electing a master node for the group of nodes based on the determined relative priority, the master node having a highest relative priority in the group of nodes;

setting a chunk boundary for streaming content from the master node, wherein setting the chunk boundary comprises setting the chuck boundary corresponding to the chunk information from the chunk length field and the chunk boundary field of the elected master node; and sending, to the group of nodes, a synchronization information comprising chunk boundary information, the chunk boundary information comprising a chunk boundary location for a boundary of a last chunk of the streaming content and a chunk length indicating a distance from the boundary to a next chunk of the streaming content.

9. The non-transitory computer-readable medium of claim 8, further comprising performing a check at the given node to determine if the chunk boundary location for streaming the content from the given node is properly aligned with a corresponding chunk boundary location determined from the synchronization data in the information message from the other node.

10. The non-transitory computer-readable medium of claim 9, wherein in response to determining that the check fails and if the given node has the greater priority, the method further comprising sending another information message from the given node.

11. The non-transitory computer-readable medium of claim 9, wherein in response to determining that the check fails and if the other node has the greater priority, the method further comprising recalculating the chunk boundary for streaming subsequent content from the given node according to the synchronization data provided in the information message, the recalculated chunk boundary being stored as synchronization data at the given node.

12. The non-transitory computer-readable medium of claim 8, wherein determining the relative priority of the given node further comprises comparing the node ID data from the query message with the node identifier of the given node, such that the given node sets itself as one of a master node or a slave node based on the comparison.

13. The non-transitory computer-readable medium of claim 8, wherein the content comprises a video service, the streaming content from the given node comprises at least one video elementary stream and a plurality of audio elementary streams, a corresponding chunk boundary location being set for each video elementary stream and each of the plurality of audio elementary streams.

14. The non-transitory computer-readable medium of claim 13, further comprising transcoding at least some of the elementary streams at the given node to generate transcoded elementary streams having chunks of content that are aligned based on the chunk boundary that is set for each of the at least some elementary streams.

15. A system comprising:
a memory storage; and
a processing unit coupled to the memory storage, wherein the processing unit is operative to:
receive a message at the system comprising a given node of a group of nodes that is provided from an other node of the group of nodes, wherein the message comprises a node identifier and chunk information for the other node, the chunk information comprising a video chunk information field having a chunk length field and a chunk boundary field;

determine a relative priority between the given node and the other node of the group of nodes based on the node identifier;

elect a master node for the group of nodes based on the determined relative priority, the master node having a highest relative priority in the group of nodes;

set a chunk boundary for streaming content from the master node, wherein setting the chunk boundary comprises setting the chuck boundary corresponding to the chunk information from the chunk length field and the chunk boundary field of the elected master node; and send, to the group of nodes, a synchronization information comprising chunk boundary information, the chunk boundary information comprising a chunk boundary location for a boundary of a last chunk of the streaming content and a chunk length indicating a distance from the boundary to a next chunk of the streaming content.

16. The system of claim 15, wherein the processing unit is further operative to perform a check at the given node to determine if the chunk boundary location for streaming the content from the given node is properly aligned with a corresponding chunk boundary location determined from the synchronization data in the information message from the other node.

17. The system of claim 16, wherein in response to determining that the check fails and if the given node has the greater priority, the processing unit is further operative to send another information message from the given node.

18. The system of claim 16, wherein in response to determining that the check fails and if the other node has the greater priority, the processing unit is further operative to recalculate the chunk boundary for streaming subsequent content from the given node according to the synchronization data provided in the information message, the recalculated chunk boundary being stored as synchronization data at the given node.

19. The system of claim 15, wherein the processing unit being operative to determine the relative priority of the given node further comprises the processing unit being operative to compare the node ID data from the query message with the node identifier of the given node, such that the given node sets itself as one of a master node or a slave node based on the comparison.

20. The system of claim 15, wherein the content comprises a video service, the streaming content from the given node comprises at least one video elementary stream and a plurality of audio elementary streams, a corresponding chunk boundary location being set for each video elementary stream and each of the plurality of audio elementary streams.

* * * * *